(12) United States Patent
Cheng et al.

(10) Patent No.: US 7,051,363 B2
(45) Date of Patent: May 23, 2006

(54) SYSTEM AND METHOD FOR INTERFACING TO DIFFERENT IMPLEMENTATIONS OF THE INTELLIGENT PLATFORM MANAGEMENT INTERFACE

(75) Inventors: Heung-For Cheng, Portland, OR (US); Simon Tsang, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 703 days.

(21) Appl. No.: 09/956,115

(22) Filed: Sep. 20, 2001

(65) Prior Publication Data

US 2003/0055955 A1    Mar. 20, 2003

(51) Int. Cl.
*G06F 17/00* (2006.01)
(52) U.S. Cl. .................... 726/2; 726/3; 726/27
(58) Field of Classification Search .......... 709/224, 709/223, 220, 203; 726/2, 3, 27
See application file for complete search history.

(56) References Cited

U.S. PATENT DOCUMENTS

| 6,496,790 B1* | 12/2002 | Kathavate et al. ......... 702/188 |
| 2003/0005367 A1* | 1/2003 | Lam ........................... 714/42 |
| 2003/0046339 A1* | 3/2003 | Ip ............................... 709/203 |

OTHER PUBLICATIONS

"Intelligent Chassis Managment Bus Bridge Revision 1.2", Apr. 11, 2000, [Retrieved from Internet Mar. 16, 2005], ftp://download.intel.com/design/servers/ipmi/ICMB_1013.pdf.*

Hardware security for software privacy support; Gilmont, T.; Legat, J.-D.; Quisquater, J.-J.; Electronics Letters; vol. 35, Issue 24, Nov. 25, 1999 pp.: 2096-2098.*

Multi-agent system for security auditing and worm containment in metropolitan area networks; Xiantai Gou; Weidong Jin; Autonomous Decentralized Systems, 2005. ISADS 2005. Proceedings Apr. 4-8, 2005 pp.: 201-207.*

PGSP: a protocol for secure communication in peer-to-peer system; Arora, N.; Shyamasundar, R.K.; Wireless Communications and Networking Conference, 2005 IEEE vol. 4, Mar. 13-17, 2005 pp.: 2094-2099 vol. 4.*

"Intelligent Platform Management Interface", http://developer.intel.com/design/servers/ipmi/spec.htm; pp. 1-2.

"IPMI v1.5 Addenda, Errata, and Clarifications Intelligent Platform Management Interface Specification v1.5, revision 1.0", pp. i-vii, 1-60.

* cited by examiner

*Primary Examiner*—David Jung
(74) *Attorney, Agent, or Firm*—Kenyon & Kenyon LLP

(57) ABSTRACT

A system, method and computer program which enables the reception of chassis status by a remote management console from different types of computers servers having different implementations of intelligent platform management interface (IPMI). This system, method and computer program utilizes a platform instrumentation control GUI located in the console to request chassis status and receive chassis from the server. Further, a component instrumentation module located in the server is used to receive the chassis status request from the console and retrieve the chassis status from platform management hardware located in the sever.

25 Claims, 4 Drawing Sheets

SYSTEM AND METHOD FOR INTERFACING TO DIFFERENT IMPLEMENTATIONS OF THE INTELLIGENT PLATFORM MANAGEMENT INTERFACE

FIELD

The invention relates to a system and method for interfacing to different implementations of the intelligent platform management interface (IPMI). More particularly, the present invention is a method and computer program which enables the reception of chassis status by a remote management console from different types of computers servers having different implementations of IPMI.

BACKGROUND

In the rapid development of computers many advancements have been seen in the areas of processor speed, throughput, communications, and fault tolerance. Initially computer systems were standalone devices in which a processor, memory and peripheral devices all communicated through a single bus. Later, in order to improve performance, several processors were interconnected to memory and peripherals using one or more buses. In addition, separate computer systems were linked together through different communications mechanisms such as, shared memory, serial and parallel ports, local area networks (LAN) and wide area networks (WAN). Further, with the development of the Internet and advancements in its cellular and wireless communications, it is now possible for computers to communicate without the use of wires, such as provided by the public switched telephone network (PSTN), over great distances.

With the advent of local area networks, wide area networks, and the Internet, manufacturers of servers saw the need for the ability to remotely monitor the physical health characteristics of these servers. Such physical health characteristics include, but not limited to, temperature, voltage, fans, power supplies and chassis access. In order to facilitate the ability to monitor different servers from different manufacturers the IPMI specification version 1 and 1.5 was developed. Such an IPMI specification was intended to facilitate the access and monitoring of different servers from different suppliers. Therefore, as illustrated in FIG. 1, a server 30 and console 10 with the appropriate IPMI specification hardware and software installed in both would allow the console 10 to access server 30 over a packet switched Internet protocol (IP) network 20 and determine the status of servers 30 from a remote location. It should be noted that console 10 may be any type of personal computer (PC) or other processor based system.

However, the specific command and format of acquiring chassis status has been implemented differently by different manufacturers. Therefore, even when a server is IPMI compliant hardware it may not be possible for the same component instrumentation software from another manufacturer to be assured of being able to request and receive chassis status. Further, events relating to the chassis status of a server 30 being reported to the IPMI system event log are accessed by the component instrumentation software. Different manufacturers may implement the events in a different way that the component instrumentation software from another manufacturer may not understand.

Therefore, what is required is a system and method whereby regardless of the specific implementation of chassis status within a server it will still be possible for a component instrumentation software that is IPMI compliant to access chassis status. Further, regardless of the different formats of the events for chassis status, events would still be received and understood by the component instrumentation software.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figure 1:
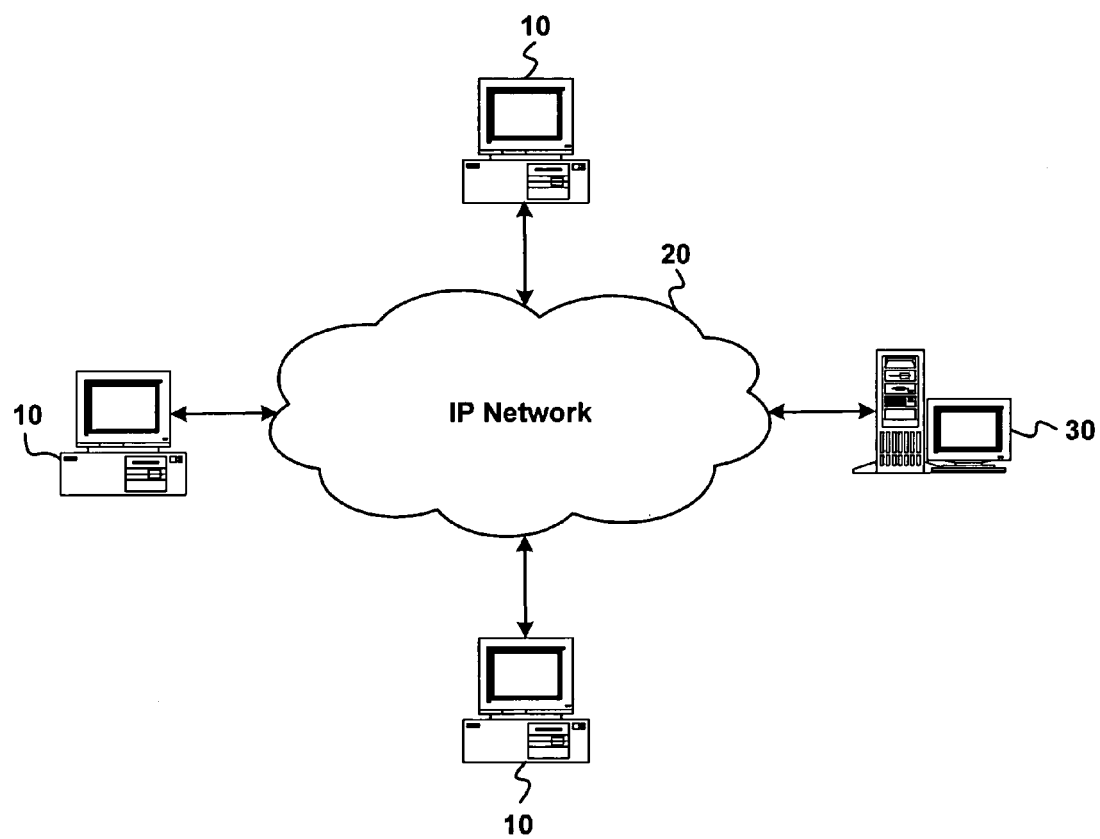
FIG. 1 is an example of an packet switched Internet Protocol (IP) network.

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same. As a final note, well-known components of computer networks may not be shown within the FIGs. for simplicity of illustration and discussion, and so as not to obscure the invention.

Figure 2:
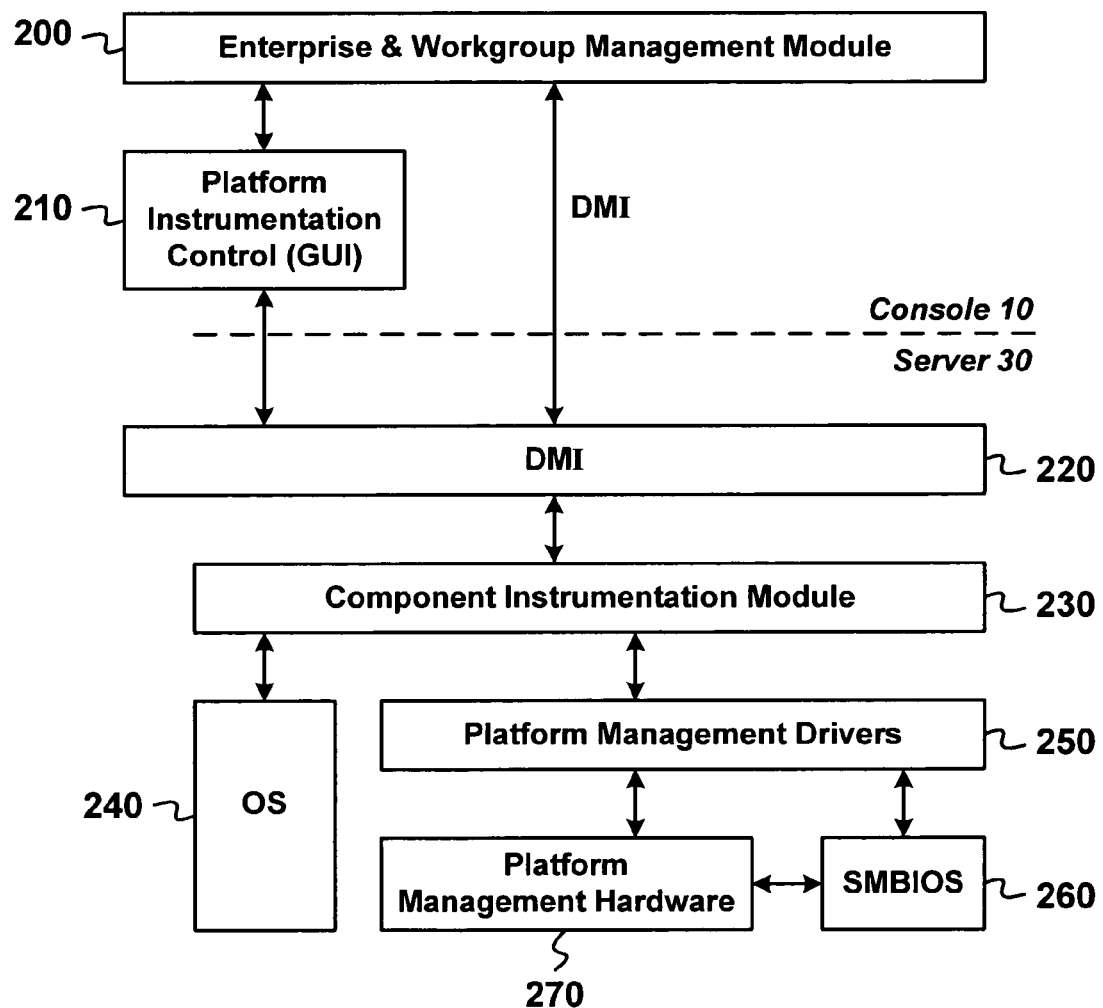
FIG. 2 is a systems diagram of communications between a console and a server in an example embodiment of the present invention.

FIG. 2 is a systems diagram of communications between a console 10 and a server 30 in an example embodiment of the present invention. As would be appreciated by one of ordinary skill in the art, FIG. 2 is a simplified illustration, so as not to obscure the invention, of the communications software necessary for one computer to communicate to another.

Still referring to FIG. 2, in order to facilitate communications between providers of different hardware and software, schemas and standards have been established. One such schema is the desktop management interface (DMI) 220 developed by the Distributed Management Task Force (DMTF). DMI 220 provides a bidirectional path to integrate all hardware and software components within a server 30. With DMI 220 enabled, a console 10 in the IP network 20 may monitor the operations in the server 30. Further, data may be transferred from the server 30 to the console 10 utilizing this DMI 220 capability.

Figure 3:
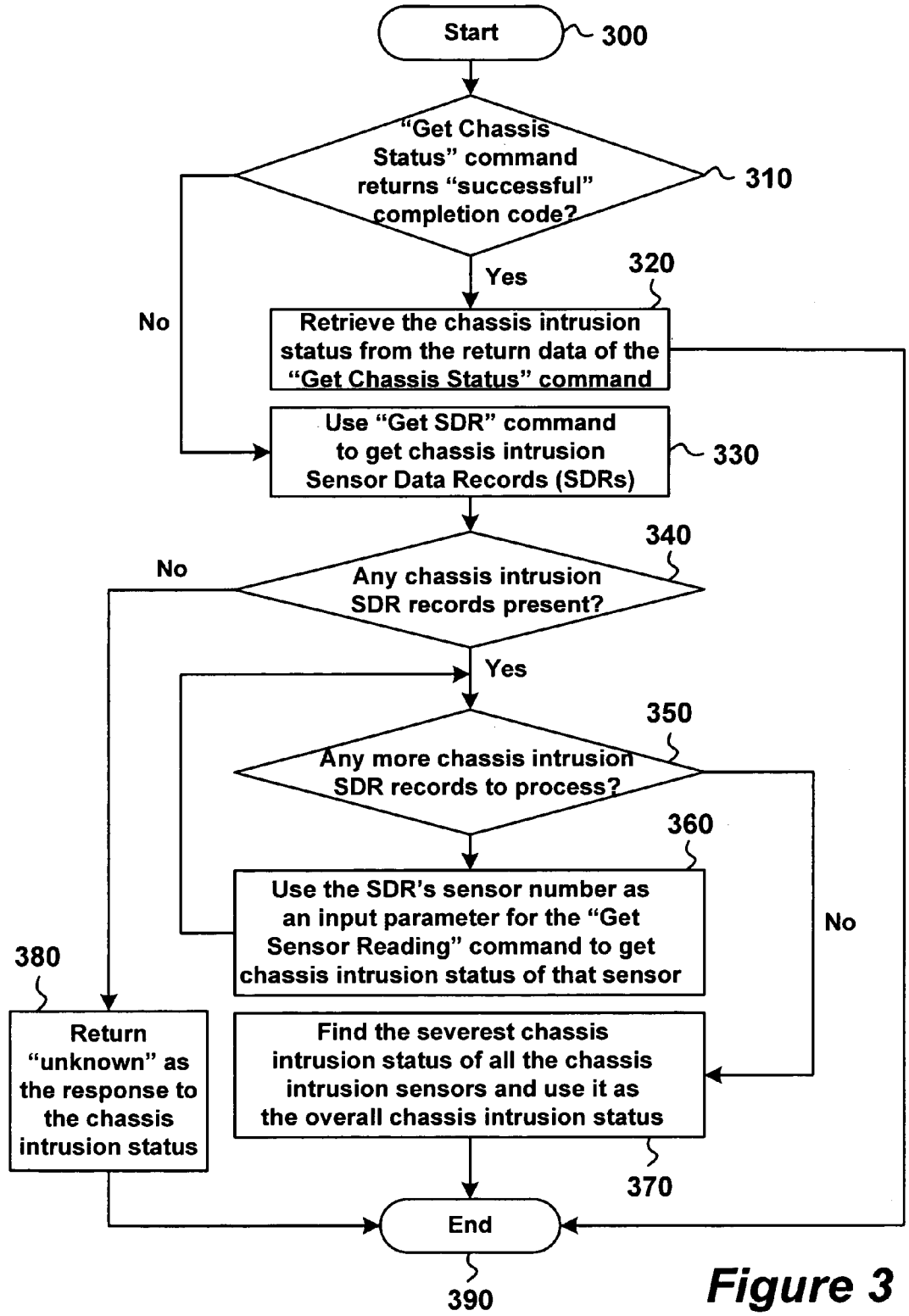
FIG. 3 is a flowchart of the processing involved in a component instrumentation software requesting and receiving chassis status in an example embodiment of the present invention.

Still referring to FIG. 2, DMI 220 would in turn communicate to the component instrumentation module 230 which is discussed in further detail in reference to FIG. 3 and FIG.

4 ahead. The component instrumentation module 230 is utilized to properly interpret requests for chassis status and generate events transmitted to a console 10 in the appropriate format. In turn the component instrumentation module 230 communicates to the operating system (OS) 240 and the platform management drivers 250. The platform management drivers 250 would include such data as device drivers for peripherals, mass storage devices, and communications devices. These platform management drivers 250 would in turn communicate to the platform management hardware 270 and the system management basic input/output system (SMBIOS) 260. The platform management hardware 270 may also contain the IPMI controller and hardware to remotely monitor and manage the server 30. The SMBIOS 260 may be used at system start-up to determine the server 30 configuration of hardware on the system.

Still referring to FIG. 2, components of console 10 are also illustrated. As would be appreciated by one of ordinary skill in the art, the components illustrated in console 10 may not comprise all the hardware and software required to operate console 10 in order that the present invention not be obscured. Console 10 and server 30 communicate DMI interface 220 previously discussed to either the enterprise and workgroup management module 200 or the platform instrumentation control 210 graphic user interface (GUI). It is this platform instrumentation control 210 GUI that contains the software instructions necessary to communicate with server 30 and utilized capabilities of the IPMI controllers and hardware contained in the platform management hardware 270 of the server 30. The enterprise and workgroup management module 200 contains the balance of the software required to operate the console such as, but not limited to, the operating system.

Figure 4:
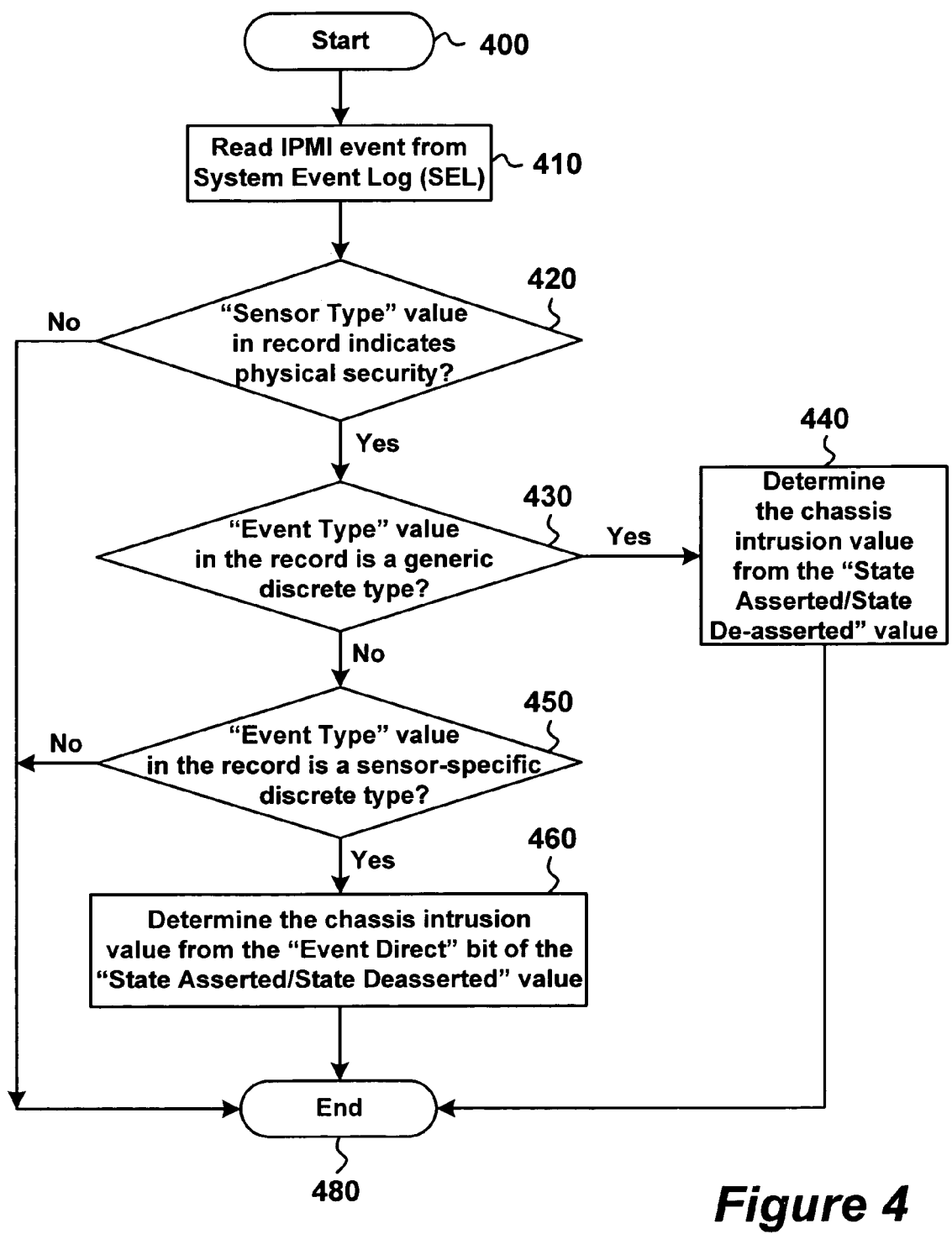
FIG. 4 is a flowchart of the processing involved in a component instrumentation software receiving an event relating to chassis status in an example embodiment of the present invention.

Before proceeding into a detailed discussion of the logic used by the embodiments of the present invention it should be mentioned that the flowcharts shown in FIGS. 3 and 4 as well as the systems diagram shown in FIG. 2 contain software, firmware, hardware, processes or operations that correspond, for example, to code, sections of code, instructions, commands, objects, hardware or the like, of a computer program that is embodied, for example, on a storage medium such as floppy disk, CD Rom, EP Rom, RAM, hard disk, etc. Further, the computer program can be written in any language such as, but not limited to, for example C++. In the discussion of the flowcharts in FIGS. 3 and 4, reference will be simultaneously made to the corresponding software modules shown in FIG. 2.

FIG. 3 is a flowchart of the processing involved in a console 10 requesting and receiving chassis status from a server 30 through the component instrumentation module 230 in an example embodiment of the present invention. Processing begins in operation 300 and immediately proceeds to operation 310. In operation 310, it is determined by the component instrumentation module 230 whether a "get chassis status" command returns a successful completion code from the IPMI controller and hardware in the platform management hardware 270. If a successful completion code is received in operation 310 the processing proceeds to operation 320. In operation 320, the return data from the "get chassis status" command is examined for the intrusion status value. This intrusion status value would then be reported to the user or other software contained in console 10. Thereafter, processing proceeds from operation 320 to operation 390, where processing terminates.

Still referring to FIG. 3, if however in operation 310 a successful completion code is not returned then processing proceeds to operation 330. In operation 330 a get "sensor data record" (SDR) command is issued to the IPMI controller and hardware in the platform management hardware 270. Thereafter, processing proceeds to operation 340 where it is determined if any SDR records are present in the platform management hardware 270 relating to a chassis intrusion. If in operation 340, it is determined that there are no SDR records present relating to chassis intrusions, then processing proceeds to operation 380 where the component instrumentation module 230 reports to the platform instrumentation control GUI 210 via DMI 220 that it is unknown if a chassis intrusion has occurred. Processing then proceeds from operation 380 to operation 390 where processing terminates.

Still referring to FIG. 3, if in operation 340 it is determined that SDR records are present, then processing proceeds to operation 350 where it is determined if any SDR records remain to be processed. If in operation 350 there are SDR records to be processed, then operation 360 is executed. In operation 360, a "get sensor reading" command is issued to the platform management hardware 270 specifying the sensor number of interest as an input parameter. Processing then loops back to operation 350 and repeats operations 350 and 360 until no further SDR records are discovered. Thereafter, processing proceeds to operation 370 where all the chassis intrusion status data are sorted based on the severity of the chassis intrusion status received. The most severe chassis intrusion would then be reported to the platform instrumentation control GUI 210 in console 10 via DMI 220. Such severity considerations would comprise, for example, the chassis door being opened, disk drives absent, processor removed, etc., further, these severity considerations may be based on the degree of recoverability. The reason to find the most severe chassis intrusion status is to report a critical chassis status when some status data are ok and some status data are critical. Thereafter, processing proceeds from operation 370 to operation 390 where processing terminates.

FIG. 4 is a flowchart of the processing involved in a console 10 receiving an event relating to chassis status in an example embodiment of the present invention. Processing begins in operation 400 and immediately proceeds to operation 410. In operation 410, the IPMI event is read from the system event log (SEL) contained within the platform management hardware 270 by the component instrumentation module 230. In operation 420, it is determined whether the "sensor type" value contained in the SEL record relates to physical security. As would be appreciated by one of ordinary skill in the art events and interrupts occur frequently during the normal operation of a computer and IPMI controllers and hardware may primarily be related to physical security. If the "sensor type" does not deal with physical security, this means that there is no chassis intrusion determined at this time. Processing then proceeds to operation 480 where processing terminates.

Still referring to FIG. 4, if in operation 420 it is determine that the "sensor type" value in the SEL record deals with physical security, then processing proceeds to operation 430. In operation 430, it is determine whether this "event type" value is a generic discrete type of event. Events are classified as either discrete indicative either of a zero or one value or on or off condition, or they may be classified as an analog events. An example of a discrete event may be whether the chassis door is opened or closed. An example of analog event may be the temperature within the chassis. In addition, discrete events may be further described as generic or specific. A generic discrete event may relate to a class of sensors connected to a specific device. For example, a generic event relating to the server 30 power supply may be caused by no voltage, low-voltage, or high-voltage being generated by the power supply. While a specific discrete event type would relate to a specific sensor, such as, but not limited to, the chassis door being opened on the server 30.

Still referring to FIG. 4, if in operation 430 it is determine that the event type is a generic discrete event then processing proceeds to operation 440 where the chassis intrusion value is determined. This chassis intrusion value may be either asserted or de-asserted indicative of whether the door to the chassis is opened or closed. Thereafter, processing proceeds operation 480 where processing terminates.

Still referring to FIG. 4, if in operation 430 it is determined that this is not a generic discrete type, then processing proceeds to operation 450 where it is determined if this is a specific discrete type of event. If in operation 450 it is determined that this is not a specific discrete type event and thus there is no chassis intrusion at this time. Thereafter, processing proceeds to operation 480 or processing terminates.

Still referring to FIG. 4, if in operation 450 it is determine that the "event type" is a specific discrete type of event, then processing proceeds to operation 460. In operation 460, the "event direction" bit of the asserted/de-asserted value received from the platform management hardware 270 is examined. This "event direction" bit in combination with the state asserted/de-asserted value would indicate which specific sensor type is involved as well as its status. For example, operation 460 may indicate that a specific portion of a chassis has been accessed such as a disk drive.

The benefit resulting from the present invention is that a simple, reliable, fast system and method is provided for servers, with IPMI capability, from different providers to be remotely accessed and the chassis status determined from a PC having IPMI capability.

While we have shown and described only a few examples herein, it is understood that numerous changes and modifications as known to those skilled in the art could be made to the example embodiment of the present invention. Therefore, we do not wish to be limited to the details shown and described herein, but intend to cover all such changes and modifications as are encompassed by the scope of the appended claims.

We claim:

1. A system for determining chassis status of a server from a console, comprising:
   a platform instrumentation control GUI located in the console to request chassis status and receive chassis status from the server; and
   a component instrumentation module located in the server to receive the chassis status request from the console and retrieve the chassis status from platform management hardware located in the sever using a get chassis status command or accessing sensor data reading from records located in the platform management hardware based on a successful completion code received in response to the get chassis status command.

2. The system recited in claim 1, wherein the successful completion code is provided by the platform management hardware when an IPMI controller and hardware in the platform management hardware is configured to receive the get chassis status command.

3. The system recited in claim 2, wherein when the successful completion code is not provided by the platform management hardware the component instrumentation issues a get chassis intrusion sensors data records command to the platform management hardware.

4. The system recited in claim 3, wherein when the get chassis intrusion sensors data records command is issued each sensor data record is accessed and a get sensors reading command is issued using a sensors number received from the sensors data record.

5. The system recited in claim 4, wherein responses from the get sensors reading command are retained and sorted according to the severity by the component instrumentation module.

6. The system recited in claim 5, wherein the component instrumentation module transmits the response having the highest severity to the console as the chassis intrusion status.

7. The system recited in claim 2, wherein the component instrumentation module reads a system event log in the platform management hardware to determine if any chassis intrusion events have occurred.

8. The system recited in claim 7, wherein the component instrumentation module determines if the chassis intrusion status is asserted when the event is a generic discrete type of an event occurs.

9. The system recited in claim 8, wherein the component instrumentation module accesses an event direction bit in a state asserted/state de-asserted value retrieved from the system event log when the event is a specific discrete type of event.

10. A method of determining chassis status of a server from a console, comprising:
    issuing a get chassis status command and receiving a successful completion code from the server;
    transmitting the chassis status to the console when the successful completion code is received;
    transmitting a get sensor records command when the successful completion code is not received;
    accessing all sensors records in the server when the successful completion code is not received; and
    transmitting the chassis status from the sensor records in the server having a highest severity level to the console when the successful completion code is not received.

11. The method recited in claim 10, wherein the transmitting a get sensor records command when the successful completion code is not received is transmitted to a platform management hardware contained within the server allowing access to sensor data records.

12. The method recited in claim 11, wherein the accessing all sensors records in the server when the successful completion code is not received, further comprising:
    issuing a get sensor command based upon a sensor number contained within each sensor record; and
    receiving the chassis intrusion status from each sensor.

13. The method recited in claim 12, wherein a specific discrete type event is related to a specific sensor and has a state asserted or de-asserted value associated with the generic discrete type event.

14. The method recited in claim 12, wherein the transmitting the chassis status from the sensor records in the server having a highest severity level to the console when the successful completion code is not received, further comprises:
    sorting the chassis intrusion status based on a probability of recovery associated with each sensor.

15. The method recited in claim 10, further comprising:
    reading sensor events from a system event log in the server;
    determining if the sensor events deal with physical security; and
    transmitting the sensor event to the console.

16. The method recited in claim 15, wherein the sensor events may be either a generic discrete type event or specific discrete type event.

17. The method recited in claim 16, wherein a generic discrete type event is related to a class of sensors and has a state asserted or de-asserted value associated wit the generic discrete type event.

18. A computer program embodied on a computer readable medium executable by a computer determining chassis status of a server from a console, comprising:
   issuing a get chassis status command and receiving a successful completion code from the server;
   transmitting the chassis stats to the console when the successful completion code is received;
   transmitting a get sensors records command when the successful completion code is not received;
   accessing all sensors records in the server when the successful completion code is not received; and
   transmitting the chassis status from the sensor records in the server having a highest severity level to the console when the successful completion code is not received.

19. The computer program recited in claim 18, wherein the transmitting a get sensors records command when the successful completion code is not received is transmitted to a platform management hardware contained within the server allowing access to sensor data records.

20. The computer program recited in claim 19, wherein the accessing all sensors records in the server when the successful completion code is not received, further comprising:
   issuing a get sensor command based upon a sensor number contained within each sensor record; and
   receiving the chassis intrusion status from each sensor.

21. The computer program recited in claim 20, wherein to transmitting the chassis status from the sensor records in the server having a highest severity level to the console when the successful completion code is not received, further comprises:
   sorting the chassis intrusion status based on a probability of recovery associated with each sensor.

22. The computer program recited in claim 18, further comprising:
   reading sensor events from a system event log in the server;
   determining if the sensor events deal with physical security; and
   transmitting the sensor event to the console.

23. The computer program recited in claim 22, wherein the sensor events may be either a generic discrete type event or specific discrete type event.

24. The computer program recited in claim 23, wherein a generic discrete type event is related to a class of sensors and has a state asserted or de-asserted value associated with the generic discrete type event.

25. The computer program recited in claim 24, wherein a specific discrete. type event is related to a specific sensor and has a state asserted or de-asserted value associated with the generic discrete type event.

* * * * *

UNITED STATES PATENT AND TRADEMARK OFFICE
CERTIFICATE OF CORRECTION

PATENT NO. : 7,051,363 B2  Page 1 of 1
APPLICATION NO. : 09/956115
DATED : May 23, 2006
INVENTOR(S) : Heung-For Cheng et al.

It is certified that error appears in the above-identified patent and that said Letters Patent is hereby corrected as shown below:

Column 5, Line 43:   "in the sever"
    should be:    --in the server--

Column 7, Line 13:   "chassis stats"
    should be:    --chassis status--

Column 8, Line 4:    "wherein to"
    should be:    --wherein the--

Signed and Sealed this

Twenty-third Day of January, 2007

JON W. DUDAS
*Director of the United States Patent and Trademark Office*